United States Patent
Nivet et al.

(10) Patent No.: US 9,151,684 B2
(45) Date of Patent: Oct. 6, 2015

(54) BEARING TEST BENCH

(71) Applicants: SNECMA, Paris (FR); CENTRE NATIONAL D'ETUDES SPATIALES CNES, Paris (FR)

(72) Inventors: Philippe Nivet, Cantiers (FR); Fabien Tessier, Vernon (FR); Laurent Fabbri, Gasny (FR); Valerie Begin, Vernon (FR)

(73) Assignees: SNECMA, Paris (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 0 days.

(21) Appl. No.: 14/245,352

(22) Filed: Apr. 4, 2014

(65) Prior Publication Data

US 2014/0298917 A1    Oct. 9, 2014

(30) Foreign Application Priority Data

Apr. 9, 2013    (FR) ..................................... 13 53186

(51) Int. Cl.

| | |
|---|---|
| *G01M 5/00* | (2006.01) |
| *G01L 1/16* | (2006.01) |
| *G01L 25/00* | (2006.01) |
| *G01M 13/04* | (2006.01) |
| *G01L 5/00* | (2006.01) |

(52) U.S. Cl.
CPC ................ *G01L 1/16* (2013.01); *G01L 5/0019* (2013.01); *G01L 25/00* (2013.01); *G01M 13/045* (2013.01)

(58) Field of Classification Search
CPC ..... G01M 17/0072; G01L 1/16; G01L 25/00; G01L 5/0019; G01L 5/221; G01L 3/104; B62D 6/10

USPC .................... 73/785, 788, 856, 760
See application file for complete search history.

(56) References Cited

U.S. PATENT DOCUMENTS

| | | | | |
|---|---|---|---|---|
| 3,127,761 | A * | 4/1964 | Gordon ............................... | 73/9 |
| 4,038,863 | A * | 8/1977 | Mellor et al. ........................ | 73/9 |
| 4,672,838 | A * | 6/1987 | Reh ................................... | 73/9 |

(Continued)

FOREIGN PATENT DOCUMENTS

| | | |
|---|---|---|
| EP | 2 405 249 A1 | 1/2012 |
| FR | 2 826 117 A1 | 12/2002 |
| WO | WO 02/088653 A1 | 11/2002 |

OTHER PUBLICATIONS

CN203534822 U Aug. 7, 2013 http://www.google.com/patents/CN203534822U?cl=en.*

(Continued)

*Primary Examiner* — Max Noori
(74) *Attorney, Agent, or Firm* — Oblon, McClelland, Maier & Neustadt, L.L.P.

(57) ABSTRACT

The invention relates mainly to a test bench (10) for a radial bearing (14) suitable for being interposed between two members (12, 16) that are movable relative to each other in rotation, the test bench being characterized in that it comprises a radial force measurement device (18) for measuring radial forces exerted on said bearing (14), a radial acceleration measurement device (20) for measuring radial accelerations to which said bearing (14) is subjected, and an electronic calculation unit (26) in communication with the radial force measurement device (18) and with the radial acceleration measurement device (20). The invention also relates to a method of establishing a behavior relationship for the radial bearing (14).

6 Claims, 2 Drawing Sheets

(56) References Cited

U.S. PATENT DOCUMENTS

| | | | |
|---|---|---|---|
| 5,703,295 A | 12/1997 | Ishida et al. | |
| 6,450,023 B1 * | 9/2002 | Addie et al. | 73/168 |
| 2002/0194927 A1 | 12/2002 | Yoshida et al. | |
| 2004/0118209 A1 | 6/2004 | Mol et al. | |
| 2005/0041898 A1 | 2/2005 | Yamada et al. | |
| 2012/0192631 A1 * | 8/2012 | Tecza et al. | 73/112.01 |
| 2012/0323372 A1 * | 12/2012 | Gattermann et al. | 700/275 |

OTHER PUBLICATIONS

French Preliminary Search Report issued Jan. 17, 2014 in French Application 13 53186, filed on Apr. 9, 2013 (with English Translation of categories of Cited Documents).

* cited by examiner

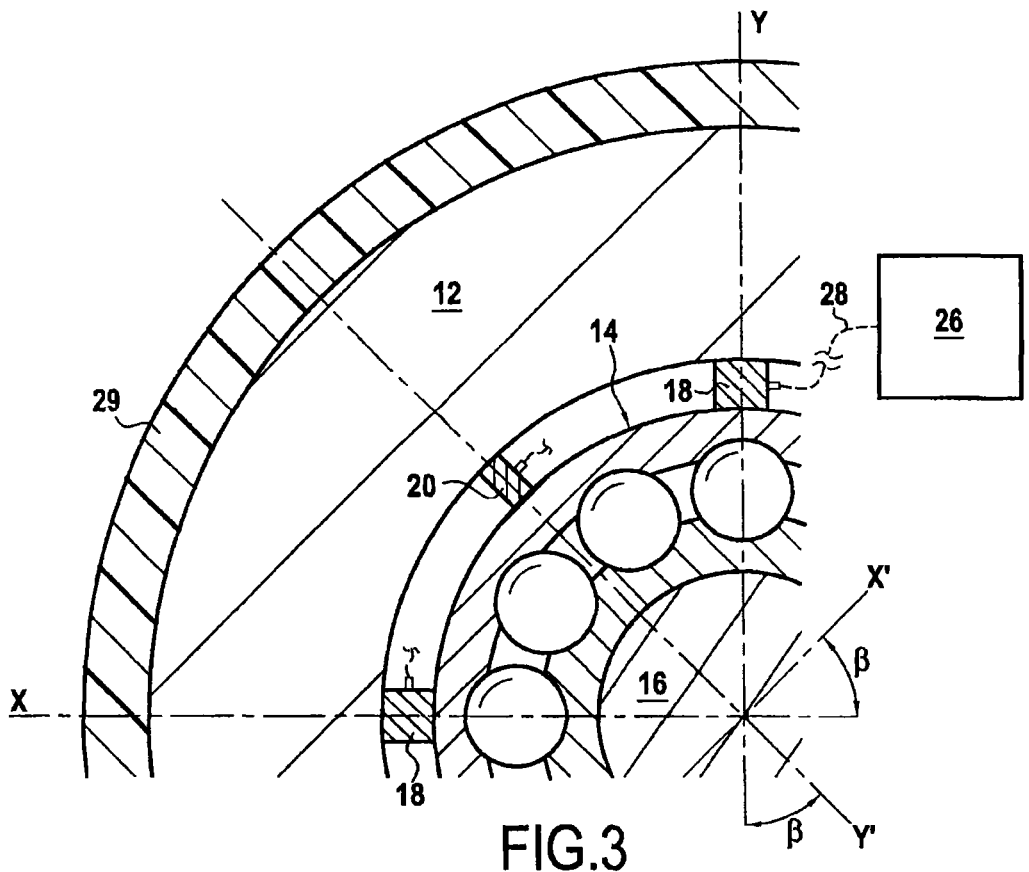
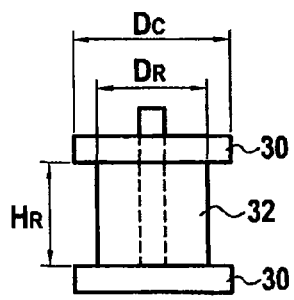
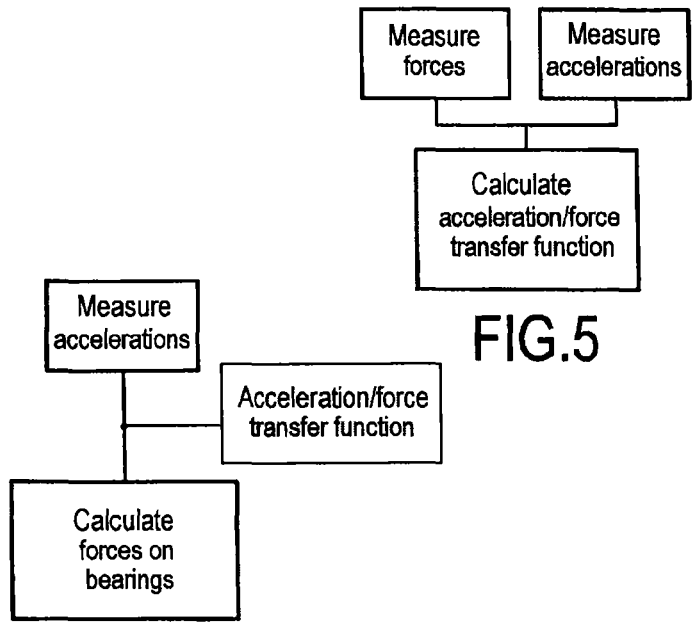

BEARING TEST BENCH

BACKGROUND OF THE INVENTION

The invention relates to a test bench for a radial bearing. The invention also relates to a method of establishing a behavior relationship for a radial bearing.

The person skilled in the art encounters difficulties in measuring the forces to which radial bearings are subjected, particularly when the radial bearings are mounted in very rigid manner. Measuring forces within a radial bearing makes it possible to monitor variation in the bearing, and specifically its wear.

When the bearing is mounted without great rigidity, various known solutions are available to the person skilled in the art, such as for example using strain gauges.

In contrast, the person skilled in the art does not have solutions for evaluating forces within a radial bearing that is mounted without clearance, and with very great rigidity. Specifically, strain gauges operate correctly only when they are subjected to deformations that are relatively large, and they are unsuitable for measuring forces on bearings that are to be mounted in a relatively rigid manner.

It is also known to use temperature sensors mounted on the outer cages for the rolling members that constitute a bearing. Such temperature sensors make it possible to calculate the resultant of the forces on the bearing as a function of the measured temperature rise. Specifically, the mechanical work performed by the forces that act on the bearing is dissipated from the bearing in the form of heat energy. It is then theoretically possible, on the basis of the measured dissipated heat energy, to calculate the resultant of the forces acting inside the bearing. Nevertheless, that calculation does not enable forces to be measured accurately in real time, nor does it enable the forces on the bearing to be measured directly.

OBJECT AND SUMMARY OF THE INVENTION

The invention thus relates to a test bench for a radial bearing that is suitable for being interposed between two members that are movable relative to each other in rotation, which bench facilitates measuring forces in real time on bearings that are mounted in relatively rigid manner in a radial plane. In at least one embodiment, this may be achieved by the fact that the test bench comprises a radial force measurement device for measuring radial forces exerted on said bearing, a radial acceleration measurement device for measuring radial accelerations to which said bearing is subjected, and an electronic calculation unit in communication with the radial force measurement device and with the radial acceleration measurement device. It is thus possible on the basis of experiment to envisage calculating a transfer function giving the radial forces as a function of the measured radial accelerations. By means of this transfer function, it is possible to envisage subsequently not mounting the radial force measurement device on the bearing, thereby facilitating the measurement of forces on the bearing in real time.

Advantageously, the test bench is suitable for receiving the bearing in a cryogenic medium. The person skilled in the art may encounter difficulties in installing force measurement means in a cryogenic medium since the means that are usually installed do not give satisfactory results. Specifically, it is not possible to envisage using conventional strain gauges in a cryogenic medium. The very low temperature of this type of medium—of the order of 20 kelvins (K) to 30 K—interferes with the deformations to which conventional strain gauges can be subjected. Furthermore, it is not appropriate to use a temperature sensor outside a cryogenic bearing, since the overall heating of the bearing can be difficult to quantify, given the very low temperatures that occur inside such a bearing. By making the test bench suitable for receiving the bearing in a cryogenic medium, it is possible to envisage using the test bench to perform tests on bearings that are to be used in a cryogenic medium, and in particular on bearings that are for cryogenic propellant turbopumps for use in rocket engines.

Advantageously, the radial force measurement device comprises at least one piezoelectric sensor suitable for generating electrical pulses in response to compression forces. Specifically, the piezoelectric sensors may be very simple in mechanical structure, with a minimum number of moving parts, and their operation depends only on the piezoelectric properties of the material used in the sensor. It is found that certain piezoelectric materials, such as lithium niobate ($LiNbO_3$), are entirely compatible with operating in a cryogenic medium, e.g. at a temperature lying in the range 20 K to 30 K.

Advantageously, the at least one piezoelectric sensor of the force measurement device is prestressed in compression; in particular it may be subjected to prestress of the order of 25 kilonewtons (kN). This prestress makes it possible to ensure greater rigidity for the bearing. In the present context, the term "prestress" is used to mean an initial static stress of the piezoelectric sensors when the bearing is at rest in the test bench. Under such circumstances, sufficient prestress in compression makes it possible to ensure that the piezoelectric sensors remain stressed in compression throughout the duration of the tests, and in spite of dynamic radial forces, thus avoiding the appearance of any radial clearance and ensuring that the assembly is rigid, while also ensuring sensitivity for the piezoelectric sensors during the test.

Advantageously, the acceleration measurement device comprises at least one piezoelectric sensor, having an inertial mass and an element made of piezoelectric material, the element being arranged between the inertial mass and the bearing in such a manner as to work in shear and generate electrical impulses in response to stresses from the inertial mass. The use of piezoelectric sensors for measuring accelerations makes it possible to have much greater sensitivity to said accelerations, without compromising the rigidity of the assembly. Furthermore, choosing to use shear mode makes it possible to limit the first-order pyroelectric effect that could falsify the acceleration measurements in a cryogenic medium.

Advantageously, said bearing is a pump bearing for a turbopump. The pump bearings in a turbopump are rigidly mounted and they operate under cryogenic conditions.

Advantageously, the invention also provides a method of establishing a behavior relationship for a radial bearing suitable for being interposed between two members that are movable relative to each other in rotation, the method comprising the following steps:

measuring radial forces to which said bearing is subjected with a radial force measurement device for measuring radial forces exerted on said bearing;

measuring accelerations to which said bearing is subjected with a radial acceleration measurement device for measuring radial accelerations to which said bearing is subjected; and communicating the measurements to an electronic calculation unit situated outside of the bearing.

Advantageously, before said steps of measuring forces and accelerations, this method includes a step consisting in calibrating both the device for measuring radial forces exerted on the bearing and also the device for measuring radial accelerations to which the bearing is subjected. The idea is to mount operational measurement devices directly on the bearing. Calibrating the measurement devices makes it possible to know their response under cryogenic conditions on bearings that are rigidly mounted.

Advantageously, the method includes an additional step that consists in establishing for said bearing a transfer function giving the accelerations as a function of the forces. This transfer function can then be inverted in order to calculate the forces solely on the basis of the measured accelerations. In the present context, the term "transfer function" is used to mean a transfer matrix between the forces and the accelerations to which the bearing is subjected, the bearing then being considered mathematically as constituting a linear system.

BRIEF DESCRIPTION OF THE DRAWINGS

Other characteristics and advantages of the invention appear on reading the following description of a preferred embodiment of the invention, given by way of example and with reference to the accompanying drawings.

FIG. 3 is a detail view of FIG. 2.

FIG. 4 is a diagrammatic view of a sensor that can be used in the force measurement device of an embodiment of the invention.

FIG. 5 is a diagram giving a mode of operation for calculating a transfer function in an implementation of the invention.

FIG. 6 is a diagram giving a mode of operation for calculating the forces to which the bearing is subjected.

DETAILED DESCRIPTION OF THE INVENTION

Figure 1:
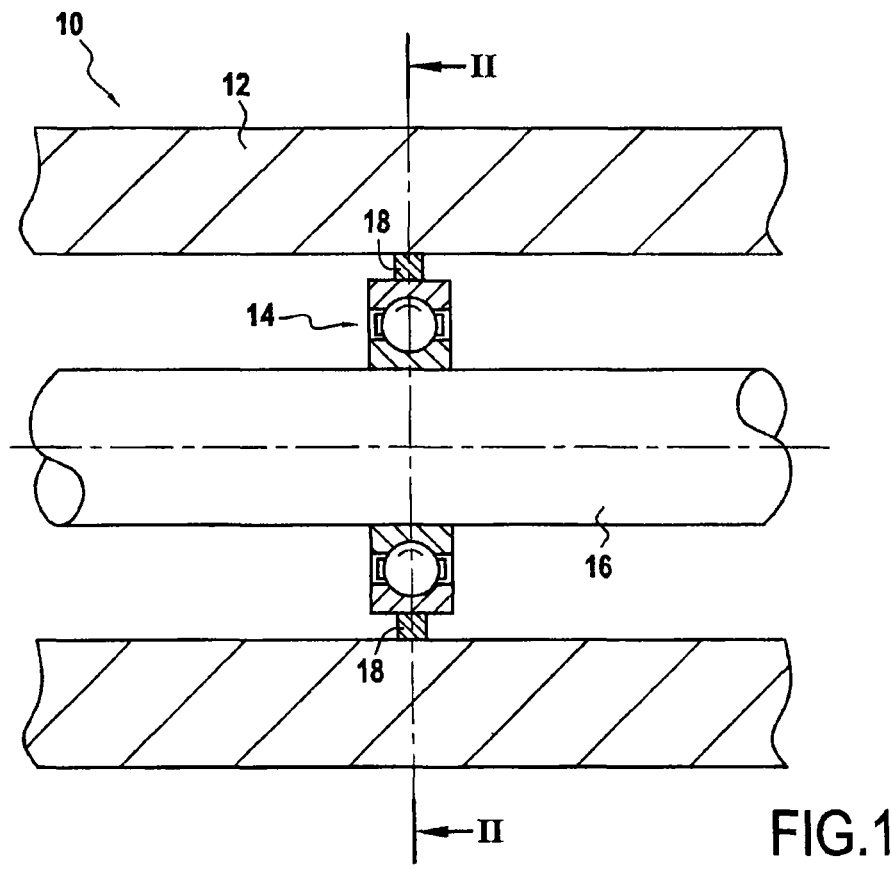
FIG. 1 is a section view of a test bench in an embodiment of the invention.
Figure 2:
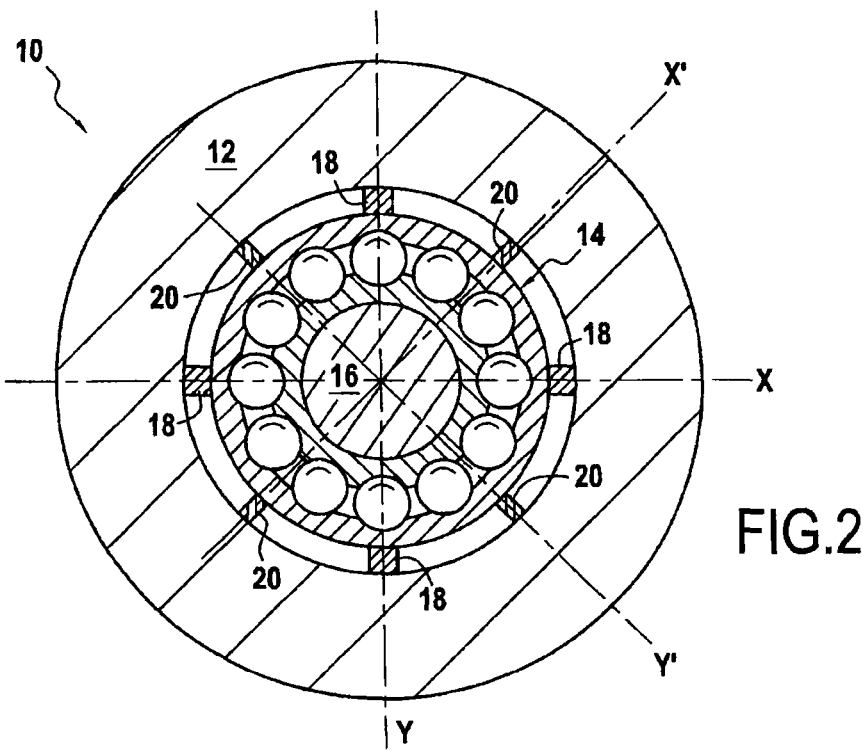
FIG. 2 is a section view on line II-II of FIG. 1.

A test bench 10 in an embodiment of the invention is shown in FIGS. 1 to 3. The test bench 10 is designed to perform tests on the operation of a radial bearing 14 suitable for being interposed between two members that are movable relative to each other in rotation. In the embodiment described, the radial bearing 14 is interposed between a stator 12 that is stationary relative to its mount and a rotor 16 that is movable in rotation. The test bench 10 has at least one radial force measurement device 18, at least one radial acceleration measurement device 20, and an electronic calculation unit 26. The test bench 10 is suitable for receiving the bearing 14 in a cryogenic medium. The test bench 10 may be designed for the bearings 14 of liquid propellant turbopumps. In the presently described embodiment, the cryogenic medium is constituted by liquid hydrogen, which is a cryogenic propellant often used in the field of space propulsion. It should be observed that the hydrogen must be maintained at a temperature of 30 K (−253° C.) in order to remain liquid. Communication between the radial force measurement device 18 and the radial acceleration measurement device 20 with the electronic calculation unit 26 takes place via a wired connection 28. Nevertheless, in an alternative embodiment, it could also take place wirelessly.

A thermal insulation enclosure 29 provides static and dynamic sealing between the inside (cryogenic environment) and the outside of the bearing (not cryogenic). In order to maintain the sealing of the enclosure 29 when communication with the electronic calculation unit 26 takes place via a wired connection 28, the enclosure 29 may include sealed connectors (not shown) connecting cables inside the enclosure to cables outside the enclosure. These sealed connectors, which may in particular be miniature connectors of the type sold by the supplier Microdot®, may be incorporated in sealed interface flanges (not shown) fastened to the enclosure 29.

The cryogenic medium constituted by liquid hydrogen is electrically insulating. This makes it possible to avoid possible losses of information due to interfering electric fields when the measurement devices communicate with the outside of the bearing 14. Specifically, the electrical pulses transmitted by the radial force measurement device to the outside of the bearing are very weak, being of pico-coulomb order. The cables inside the enclosure 29 in the wired connections 28 are preferably soldered to the force and acceleration measurement devices 18 and 20 in order to avoid any degradation in the transmission of information.

The radial force measurement device 18 comprises at least one piezoelectric sensor suitable for generating electrical pulses in response to compression forces. Preferably, the radial force measurement device 18 comprises four force sensors that are placed facing one another in pairs, each pair of sensors being on a common X or Y axis and on opposite sides of the bearing 14, as shown in FIGS. 2 and 3. The two axes X, Y on which the two pairs of force sensors are located are stationary relative to the mount, and they are mutually perpendicular. It is possible to envisage adopting some other distribution for these force sensors; for example, there could be some different number of them (more or fewer) and they need not be mounted in pairs (it is possible to provide an odd number of them). Preferably, each radial force sensor comprises a washer 32 of piezoelectric material and two washers 30 of non-piezoelectric material. The piezoelectric washer 32 is prestressed in compression between the two non-piezoelectric washers 30. The radial force sensor responds in a linear manner to the compression forces to which it is subjected. It thus makes it possible to measure very small amplitudes and it is therefore entirely suitable for measuring forces within rigidly mounted bearings. For example, the radial force sensor may be calibrated to measure forces of the order of 90 kN. The steel washers 30 may be made of an alloy of iron with other metallic compounds. In an embodiment, the diameter DR of the piezoelectric washer 32 may be about 17 millimeters (mm) and its height HR may be about 12 mm. Overall, the force sensor may present an outside diameter DC of 34.5 mm. Any other sensor suitable for functioning in a cryogenic medium may nevertheless be used as an alternative to or in addition to the sensor shown.

These force sensors are prestressed in compression on being mounted. Preferably, each of them is subjected to a prestress of the order of 25 kN.

The acceleration measurement device 20 comprises at least one piezoelectric sensor. Preferably, the acceleration measurement device comprises four acceleration sensors that may be placed facing one another in pairs, the sensors in each pair being on a common axis and on opposite sides of the bearing 14, as shown in FIGS. 2 and 3. The two axes X', Y' on which the two pairs of acceleration sensors are placed are stationary relative to the mount, perpendicular to each other, and offset by an angle β of 45° relative to the axes X, Y. It is possible to envisage adopting some other distribution for these acceleration sensors; for example, there could be some different number of them (more or fewer) and they need not be mounted in pairs (it is possible to provide an odd number of them). It is also possible for their angle relative to the force sensors to be different. Each of these piezoelectric acceleration sensors comprises: an inertial mass suitable for moving along a determined direction relative to a fastening point where the acceleration sensor is fastened to the bearing; an element of the piezoelectric material arranged between the fastening point and the inertial mass so as to generate electrical pulses in response to shear stresses generated by the relative movement of the inertial mass along said determined direction; and an electronic amplifier device for amplifying the electrical pulses generated by the piezoelectric element in order to enable the pulses to be transmitted with sufficient amplitude to the electronic calculation unit 26 that is located outside the bearing 14. By way of example, the piezoelectric material may be lithium niobate, given its piezoelectric qualities at cryogenic temperatures. Any other acceleration sensor suitable for functioning in a cryogenic medium with comparable sensitivity could nevertheless be used as an alternative in this application.

The bearing 14 is preferably a pump bearing of a turbopump that is to pump a cryogenic propellant so as to inject into the combustion chamber of a rocket engine.

FIG. 5 is a diagram of the method of establishing a behavior relationship for a radial bearing as described above. The first two steps are performed simultaneously. In one of these two steps, the radial forces to which said bearing is subjected are measured, while in the other step, the accelerations to which the same bearing is subjected are measured. By way of example, the measured forces may be about 75 newtons (N). They are measured with the help of piezoelectric sensors of the radial force measurement device 18 that, in response to these forces, send electrical signals via the wired connections 28 to the electronic calculation unit 26. Accelerations are measured with the help of the piezoelectric sensors of the acceleration measurement device 20, which sensors are sensitive to the movements of the inertial masses that they contain relative to the bearing 14 on which each acceleration sensor is fastened, and in response to these accelerations, the sensors send electrical signals over the wired connections 28. The electronic calculation unit 26 then establishes the force to acceleration transfer function that corresponds to the bearing 14 situated on the test bench 10. Thereafter, by inverting this transfer function, this makes it possible to be unaffected by the way in which the force sensors 18 might be mounted around the bearing 14. The radial forces exerted on the bearing 14 can then be calculated solely from the acceleration measurements supplied by the sensors of the acceleration measurement device 20 (see FIG. 6).

It should be observed that it is simpler to mount the sensors of the acceleration measurement device 20 than it is to mount the sensors of the force measurement device 18.

It is possible to calibrate the sensors of the force measurement device 18 and the sensors of the acceleration measurement device 20 before they are mounted around the bearing 14. This calibration is formed under cryogenic conditions and makes it possible to predict the drift of the force and acceleration sensors when cold.

Naturally, the present invention is not limited to the examples and the implementation described and shown, and it may be subjected to numerous variants by the person skilled in the art.

The invention claimed is:

1. A test bench for a radial bearing suitable for being interposed between two members that are movable relative to each other in rotation, the test bench comprising a radial force measurement device for measuring radial forces exerted on said bearing, a radial acceleration measurement device for measuring radial accelerations to which said bearing is subjected, and an electronic calculation unit in communication with the radial force measurement device and with the radial acceleration measurement device, wherein said acceleration measurement device comprises at least one piezoelectric sensor, having an inertial mass and an element made of piezoelectric material, the element being arranged between the inertial mass and the bearing in such a manner as to work in shear and generate electrical impulses in response to stresses from the inertial mass.

2. The test bench according to claim 1, which is suitable for receiving the bearing in a cryogenic medium.

3. The test bench according to claim 1, wherein said radial force measurement device comprises at least one piezoelectric sensor suitable for generating electrical pulses in response to compression forces.

4. The test bench according to claim 3, wherein the at least one piezoelectric sensor of the force measurement device is prestressed in compression.

5. The test bench according to claim 4, wherein the at least one piezoelectric sensor of the force measurement device is subjected to prestress in compression of the order of 25 kN.

6. The test bench according to claim 1, wherein said bearing is a pump bearing of a turbopump.

* * * * *